Patented Aug. 5, 1930

1,772,055

UNITED STATES PATENT OFFICE

ERNEST B. MILLER AND GERALD C. CONNOLLY, OF BALTIMORE, MARYLAND, ASSIGNORS TO THE SILICA GEL CORPORATION, OF BALTIMORE, MARYLAND, A CORPORATION OF MARYLAND

GEL AND METHOD OF PREPARING SAME

No Drawing. Application filed March 12, 1927, Serial No. 175,003. Renewed October 19, 1929.

The present invention relates to highly adsorbent low-density gels and the process of preparing the same.

The principal object of the invention is to make what may be termed "low-density" gels that are hard and tough, that is, will not be broken or injured by handling even when subjected to movement by an air blast or mechanical means such as a screw conveyor.

One of the most important features of the invention resides in the heating of a suitable hydrogel to an elevated temperature in the presence of a non-dehydrating fluid such as water, or a water saturated vapor or gas.

The steps of the complete process are as follows:

Step 1.—A hydrogel that can be converted into a highly adsorbent gel is prepared in any suitable manner. According to one well-known method, in order to secure a silica hydrogel, silicate and acid solutions are mixed with violent agitation in such proportions and concentrations as to give a solution, termed "sol", having an acidity of 0.1 N. to 0.9 N., preferably 0.5 N. Thus, if silicate and acid solutions of equal volumes are employed, a 10% solution (by weight) of hydrochloric acid may be taken and a sodium silicate solution having a specific gravity of about 1.185, although good results can be secured with sodium silicate solutions having specific gravities ranging from 1.1 to 1.3. Commercial waterglass is employed and usually contains about 9% $Na_2O$ and about 29% to 30% $SiO_2$. The vigorous agitation is required in order to maintain all parts of the solution acid. If this is not done, the alkali and acid will react, giving a precipitate and the precipitate cannot be converted into a satisfactory adsorbent. If the ingredients are taken in concentrations and proportions such that the acid in the solution is very small, say less than 0.1 N., the tendency of the ingredients to react and form a precipitate can be retarded by cooling the ingredients either before or at the time of mixing.

Step 2.—The solution, or "sol" is allowed to stand, and its viscosity gradually increases until after a few hours the whole body of sol hardens and spontaneously sets or coagulates into a homogeneous mass termed the "hydrogel". If such a hydrogel is properly washed and almost wholly dehydrated, a hard, porous, highly adsorbent gel will result.

It is to be understood that the invention is not limited to this particular manner of producing the hydrogel, as other methods may be employed.

Step 3.—The hydrogel is thoroughly washed with water, preferably warm water, say at a temperature of 150° F. and then treated in a novel manner in order to secure the low-density, highly adsorbent, final product. Heretofore, the hydrogel has been broken into pieces, washed with water, and then dehydrated to a 5% to 15% water content.

Step 4.—According to the present invention, however, the washed hydrogel is subjected to an elevated temperature in the presence of a non-dehydrating liquid, for example, water or a water saturated gas or vapor such as water saturated air or steam. It has been found that raising the temperature of the hydrogel in this manner gives a final product that has a lower apparent density and greater toughness than secured with the processes heretofore employed. If the heating is too drastic, the final gel is softer or less resistant than desired.

The elevated temperature treatment of the hydrogel may be carried out in many different ways and some of these may be listed as follows:

A. The hydrogel is placed in a tube and a water saturated vapor or gas at 175° F. to 200° F. or even up to 325° F., is passed through the tube and over and around the hydrogel. As the gas or vapor is saturated with water, it does not adsorb any water from the hydrogel. In other words, there is no drying of the hydrogel. Preferably the temperature is not elevated too rapidly. This may be accomplished by starting with the saturated vapor or gas at a temperature slightly above the room temperature, say 50° above and then gradually increasing the temperature to the desired amount, always maintaining the gas or vapor saturated with water vapor. The time for thus elevating the temperature may be from half an hour to five hours, for example. After the desired temperature has been reached, it should be reduced gradually, say in fifteen minutes to an hour or more, or the circulation of the gas may be stopped and the tube with the hydrogel therein permitted to cool to room temperature.

B. Another way of carrying out this elevated temperature treatment of the hydrogel consists in placing the hydrogel in an autoclave, adding water, and raising the temperature of the autoclave slowly to temperatures ranging from 212° to 325° F. and thereafter permitting it to cool. The autoclave may comprise a relatively long cylinder sealed at one end and flanged at the other for the introduction and removal of the materials. A cylindrical screen is fitted within this cylinder with its walls slightly spaced from the interior surface of the cylinder, to serve as a receptacle for the hydrogel. In operation, the screened compartment is charged with the hydrogel to be treated and placed within the autoclave, water being added, preferably enough to immerse the hydrogel. A cover is then bolted to the flanged end of the cylinder and the autoclave heated until the desired temperature is reached. The best results are secured by taking considerable time to raise the temperature, and the time for cooling or reducing the temperature should not be too short. The period during which the autoclave is maintained at the maximum temperature does not appear to have much, if any, influence on the final product. For example, very good results are secured by taking a period of one to five hours for the entire operations of raising the temperature, maintaining the autoclave at the raised temperature and cooling. The time for raising the temperature is preferably greater than the time for cooling or reducing the temperature. It is to be distinctly understood, however, that the invention is not in any way limited to these exact times, because an improved product is secured with any heating.

C. According to another method, the autoclave just described may be provided with a vent for the escape of steam. The autoclave is heated, thus evaporating the water which was added to the autoclave. The heating is continued, which evaporates water from the hydrogel and thus dries it. The heating may be continued until the water content has been reduced to say 5% to 15% of the dry weight of the gel. This particular method combines the feature of subjecting the hydrogel to the elevated temperature with the drying of the hydrogel into the final dried product. The temperature to which the hydrogel is subjected in this treatment would be 212° F. Considerable time should be taken to elevate the temperature to the 212°, say one or two hours or more, and after the heating the temperature should be permitted to fall slowly, say in fifteen minutes to an hour or more.

D. According to another method, the hydrogel may be immersed in water and the water heated to say 175° F. to 200° F. Considerable time should be taken to raise the temperature of the water, say one or two hours or more, and for best results the temperature should not be reduced too rapidly after this treatment, say in fifteen minutes to an hour or more.

E. In still another manner of treating the hydrogel, it is placed in perforated trays in a dryer and the same body of air circulated in an endless cycle over the hydrogel repeatedly. The temperature of this air is gradually increased up to the desired amount, say 325° F. The time for raising this temperature may be say one to five hours. After the high point of the temperature has been reached, the temperature of the air is gradually reduced to, or in the region of, the starting temperature, and this may be done in fifteen minutes to one or two hours. In this manner the air remains saturated with water vapor and has practically no drying effect on the hydrogel. Of course, a slight amount of water is taken from the hydrogel at the beginning to saturate the air, but this is so slight that it has no injurious effect on the treatment.

Instead of constantly recirculating one body of air and slowly raising the temperature thereof, the same result may be secured in a series of treatments by water saturated air at gradually increasing temperatures. Thus, the hydrogel may be first treated with water saturated air constantly recirculated and at a temperature of say 150°. The hydrogel may then be transferred immediately to a chamber wherein water saturated air is constantly recirculated at a temperature of 225°. Thereafter the hydrogel may be transferred to another chamber wherein water saturated air at 300° is constantly recirculated. Instead of treating the hydrogel with bodies of air at these several temperatures, it may be first treated by a water saturated air which has its temperature gradually raised up to say 150°. Then it may be treated in another chamber with water saturated air which has its temperature gradually raised from 150° to 225°. Finally the hydrogel may be immediately removed to another chamber wherein it is treated with water saturated air which has its temperature slowly increased from 225° F. to 300° F. Thereafter, in all cases, the hydrogel is permitted to cool slowly to room temperature, or the temperature of the air is gradually reduced to the starting temperature.

*Step 5.*—After the elevated temperature treatment, except in the treatment described in paragraph C, the hydrogel is dried in a known manner. According to one method this is accomplished by passing a stream of air over and around the gel at a temperature of 75° C. to 120° C. for a time, and then slowly increasing this temperature to 300° C. to 400° C., but other methods that will give a satisfactory product may be employed. The final product usually has a water content of 5% to 15% of the weight of the wholly dehydrated gel and may have an apparent density as low as, or lower than, 0.50, determined after the dried gel has been heated to a temperature of 1600° F.

It was stated that the hydrogel was washed before being subjected to the elevated temperature treatment, but if desired the washing step may be omitted at this point, and instead the final gel may be washed with water at the usual temperatures, or warm water or a weakly acid water. In some instances neither the hydrogel nor the final gel need be washed.

The variable factors in the treatment of the hydrogel are, the temperature to which it is subjected, the period of time to raise the temperature to the desired point, the time or period for cooling or reducing the temperature after the heating, the amount of water, and the purity of the hydrogel.

Any moderate heating of the hydrogel in the presence of water will give an improved final product, but if it is heated to too high a temperature or too drastically, the final gel is softer or less resistant than desired. Satisfactory products have been secured by raising the temperature of the hydrogel up to 175° F. to 325° F.

The time employed for raising the temperature and the time for permitting the temperature to decrease are very important factors. For example, referring to the treatment wherein the hydrogel is placed in an autoclave without any vent, subjecting the hydrogel to a slowly rising temperature, taking five hours to raise the temperature to 300° F. and about one hour to permit the temperature to decrease to 212° F., that is, to the temperature corresponding to atmospheric pressure within the autoclave, gave a final product with a lower density than in the case where about one hour was taken for raising the temperature and five minutes for permitting it to fall. An even better product is secured where the time for raising the temperature is somewhat longer than five hours and the time for permitting the temperature to fall to the point indicated somewhat longer than one hour. As previously stated, the period of time during which the hydrogel is maintained at the elevated temperature does not seem to influence the final product to any considerable extent.

As previously stated, any heating or elevating the temperature of the hydrogel in the presence of water or a water saturated gas or vapor, decreases the apparent density of the final product as compared with processes wherein the hydrogel is not subjected to this heating. It also gives a low-density gel with sufficient toughness for use in industry. In a general way, it may be said that the time for raising the temperature should be in the neighborhood of one to five hours and the time to permit the temperature to decrease or fall to a point in the region of the starting temperature should be in the neighborhood of fifteen minutes to one or two hours. Of course it will take a longer time to raise the temperature or permit it to fall where the temperature is high, say 325° F., than where the temperature is say 175° F.

In the treatment described in paragraph B, the amount of water added to the autoclave has a very decided influence on the final product. Roughly stated, there should be present sufficient water so that after the autoclave has been raised to the elevated temperature, not all of the added water will have been converted into steam. In other words, it is thought that no substantial amount of the water in the hydrogel itself should be evaporated to produce the steam in the autoclave. Expressed in another way, it is thought that the heating operation should not dehydrate the hydrogel to any marked extent, and that statement applies to all of the methods of treating the hydrogel described herein.

The purity of the hydrogel has a direct bearing on the apparent density of the final product. For example, of two batches of a given hydrogel, the one which has been washed for the longer time (within limits) and thereafter subjected to the subsequent steps of the present process, will, after being heated to 1600° F. have a lower apparent density than the same hydrogel when washed for a shorter time. By controlling the time of washing, a hydrogel of almost any degree of purity may be secured and the apparent density of the final product, after heating to 1600° F., will vary as the washed hydrogels differed in purity.

Where an impure or insufficiently washed hydrogel is subjected to the heat treatment described herein, the apparent density of the final dried product will be lowered if such heat treated hydrogel is washed after the heat treatment, that is, while in the hydrogel form. If not washed while in the hydrogel state, the apparent density will be lowered by washing the final dried product.

The material may therefore be washed at any one or more of the following points of the process, although perhaps the hydrogel washed before being subjected to the heat treatment is preferable:

(a) In the hydrogel form before the heat treatment, (b) In the hydrogel form after the heat treatment and before the hydrogel is dried.

(c) In the final dried gel form.

An adsorbent which is not heat-stable has only a limited field of use in industry. This is because, usually, an adsorbent is activated or revivified by heating. If the adsorbent will not withstand the temperature to which it is subjected in the revivifying treatment, its field of use is very much restricted. It is for this reason that the apparent density of the adsorbent is determined after it has been subjected to a heating to 1600° F. In practically no industry is a revivifying temperature of more than 1600° F. required, and so an adsorbent which does not materially lose its adsorptive power after repeated heatings to this temperature is entirely satisfactory for industrial use.

It may be said that the final product obtained by the present process has, in the main, somewhat larger pores than the final product secured by the usual process, that is, without the heat treatment of the hydrogel. Very fine pores are required in order to adsorb vapors or gases at low partial pressures, and since the product of the present process has larger pores than the gel obtained by the process described in Patent No. 1,297,724, it will not adsorb quite as much at extremely low partial pressures. On the other hand, since the final product of the present invention has a greater internal volume than the product of the process of Patent No. 1,297,724, it will adsorb greater amounts from saturated vapors, or where the gas to be adsorbed has a high partial pressure, or if the adsorption is from the liquid phase.

Although the invention has been described in connection with the treatment of a silica hydrogel, it is to be understood that it is equally applicable to the treatment of other hydrogels, for example, the hydrogels of tungstic oxide, aluminum oxide and titanium oxide, or combinations of these.

The term apparent density as used in the description and claims is the weight of a substance expressed in grams per cubic centimeter.

Having thus described the invention, what is claimed as new and desired to be secured by Letters Patent is:

1. A hard, porous, tough gel having an apparent density of not more than 0.5 determined after being heated to 1600° F.

2. A hard, porous, tough silica gel having an apparent density of not more than 0.5 determined after being heated to 1600° F.

3. In the process of preparing a hard, porous, tough gel, the steps comprising preparing a hydrogel and subjecting the hydrogel to a slow heating without any marked dehydration.

4. In the process of preparing a hard, porous, tough gel, the steps comprising preparing a hydrogel and subjecting the hydrogel to increasing temperatures in the presence of a non-dehydrating fluid.

5. The process according to claim 3 wherein the hydrogel is a hydrogel of silicic acid.

6. The process according to claim 4 wherein the hydrogel is a hydrogel of silicic acid.

7. In the process of preparing a hard, porous, tough gel, the steps comprising preparing a hydrogel, subjecting the hydrogel to a slowly rising temperature without any marked dehydration thereof and then slowly reducing the temperature.

8. The process according to claim 4 wherein the maximum temperature is 175° to 325° F.

9. The process according to claim 4 wherein the period of time for raising the temperature is not less than fifteen minutes.

10. The process according to claim 4 wherein the period of time for raising the temperature ranges from fifteen minutes to five hours.

11. The process according to claim 7 wherein the period of time for reducing the temperature is not less than fifteen minutes.

12. The process according to claim 7 wherein the period of time for reducing the temperature ranges from fifteen minutes to two hours.

13. In the process of preparing a hard, porous, tough gel, the steps consisting in preparing a hydrogel, heating the hydrogel without any marked dehydration thereof, drying the hydrogel to form the hard gel, and washing the material at any one of the stages of its preparation.

14. In the process of preparing a hard, porous, tough gel, the steps comprising preparing a hydrogel and slowly raising the temperature of the hydrogel in the presence of water.

15. In the process of preparing a hard, porous, tough gel, the steps comprising preparing a hydrogel and slowly raising the temperature of the hydrogel in the presence of a water saturated gas or vapor.

16. In the process of preparing a hard, porous, tough gel, the steps comprising preparing a hydrogel, passing a water saturated gas or vapor over the hydrogel and slowly raising the temperature of the gas or vapor.

17. In the process of preparing a hard, porous, tough gel, the steps comprising preparing a hydrogel, circulating the same body of a gas or vapor repeatedly over the hydrogel and slowly raising the temperature of the gas or vapor.

18. In the process of preparing a hard, porous, tough gel, the steps comprising preparing a hydrogel and subjecting the hydrogel to bodies of water saturated gases or vapors at increasing temperatures.

In testimony whereof we hereunto affix our signatures.

ERNEST B. MILLER.
GERALD C. CONNOLLY.